United States Patent

Schlesser et al.

(10) Patent No.: US 8,113,114 B2
(45) Date of Patent: Feb. 14, 2012

(54) TRACTOR AND BALER INTERACTION SYSTEM

(75) Inventors: Walter Mark Schlesser, Ottumwa, IA (US); Eric Ryan Lang, Donnellson, IA (US); Jason Rovey, Wickenburg, AZ (US)

(73) Assignee: Deere & Company, Moline, IL (US)

( * ) Notice: Subject to any disclaimer, the term of this patent is extended or adjusted under 35 U.S.C. 154(b) by 510 days.

(21) Appl. No.: 12/267,943

(22) Filed: Nov. 10, 2008

(65) Prior Publication Data

US 2010/0115902 A1 May 13, 2010

(51) Int. Cl.
*B30B 15/26* (2006.01)
*A01D 75/00* (2006.01)

(52) U.S. Cl. ........ 100/179; 100/43; 100/178; 56/10.2 R; 56/16.4 B

(58) Field of Classification Search ............... 100/43, 100/45, 48, 50, 100, 177, 178, 179, 188 R, 100/189; 56/10.2 R, 16.4 B, 341, 343, 344
See application file for complete search history.

(56) References Cited

U.S. PATENT DOCUMENTS

| 2,362,861 | A | * | 11/1944 | Russell | .......................... 100/20 |
| 4,034,543 | A | * | 7/1977 | Voth et al. | ....................... 56/341 |
| 4,569,282 | A | | 2/1986 | Galant | |
| 5,444,969 | A | | 8/1995 | Wagstaff et al. | |
| 5,896,782 | A | * | 4/1999 | McIlwain | ........................ 74/519 |
| 7,261,632 | B2 | * | 8/2007 | Pirro et al. | ......................... 460/6 |
| 2005/0279070 | A1 | * | 12/2005 | Pirro et al. | ..................... 56/14.6 |

FOREIGN PATENT DOCUMENTS

| EP | 1153538 | 11/2001 |
| EP | 1609349 | 12/2005 |
| EP | 1658765 | 5/2006 |
| RU | 2240674 | 11/2004 |
| SU | 865204 | 9/1981 |

OTHER PUBLICATIONS

Eurasian Search Report, 2 Pages, Dec. 16, 2009.

* cited by examiner

*Primary Examiner* — Jimmy T Nguyen

(57) ABSTRACT

An agricultural power control system including a moving element, a power source, a signal generating element and a torque modifying device. The moving element is configured to engage a quantity of crop material in a cyclical manner. The power source conveys power to the moving element. The signal generating element is configured to provide a signal relating to an anticipated quantity of crop material prior to the moving element engaging the quantity of crop material. The torque modifying device is configured to cause the power source to alter an amount of torque delivered to the moving element dependent upon the signal.

8 Claims, 5 Drawing Sheets

TRACTOR AND BALER INTERACTION SYSTEM

BACKGROUND OF THE INVENTION

The present invention relates to a tractor and baler system, and, more particularly, to an engine output modification system associated with a tractor/baler system.

DESCRIPTION OF THE RELATED ART

A plunger type hay baler includes a frame that is hitched to a tractor and is configured to receive crop material, such as hay or straw, into a pressing channel in which the crop material is pressed and formed into a bale. The baler includes a loading mechanism in which the crop material is collected from the ground and is then routed into the pressing channel in a manner that is synchronous with a plunger that moves in the pressing channel. As the plunger moves in a reciprocating manner in the pressing channel, each new flake of crop material is moved into the channel and is compacted into the bale. After a sufficient amount of crop material has been compressed, a twine threading mechanism inserts a twine through a portion of the compressed material and the twine is then knotted to complete the binding of the bale. The bale proceeds through the pressing channel and is ejected from the baling machine.

The power requirements to run the baler are cyclical in nature since the crop material is introduced prior to the movement of the plunger in each reciprocating cycle. As the plunger compresses the material, it causes a reduction in the power take-off speed due to the increased load. The increased load is reflected back to the tractor and the engine compensates for the increased load by increasing the power output. The problem with this increased power output is that it lags the power requirement thereby causing the engine to overreact and overshoot after each load of the cycle of the plunger has been completed. One method to reduce this problem has been to have rotating masses associated with the baler to thereby reduce the PTO speed reduction and the engine overshoot. However, this method along with others has been ineffective in addressing the timing of the power production with the need for the power during the cyclical operation of the baler.

What is needed in the art is a system that can coordinate the engine power production with the anticipated torque requirements of the baler.

SUMMARY OF THE INVENTION

The present invention relates to a tractor baler interface system.

The invention in one form is directed to an agricultural power control system including a moving element, a power source, a signal generating element and a torque modifying device. The moving element is configured to engage a quantity of crop material in a cyclical manner. The power source conveys power to the moving element. The signal generating element is configured to provide a signal relating to an anticipated quantity of crop material prior to the moving element engaging the quantity of crop material. The torque modifying device is configured to cause the power source to alter an amount of torque delivered to the moving element dependent upon the signal.

DETAILED DESCRIPTION OF THE INVENTION

Figure 1:
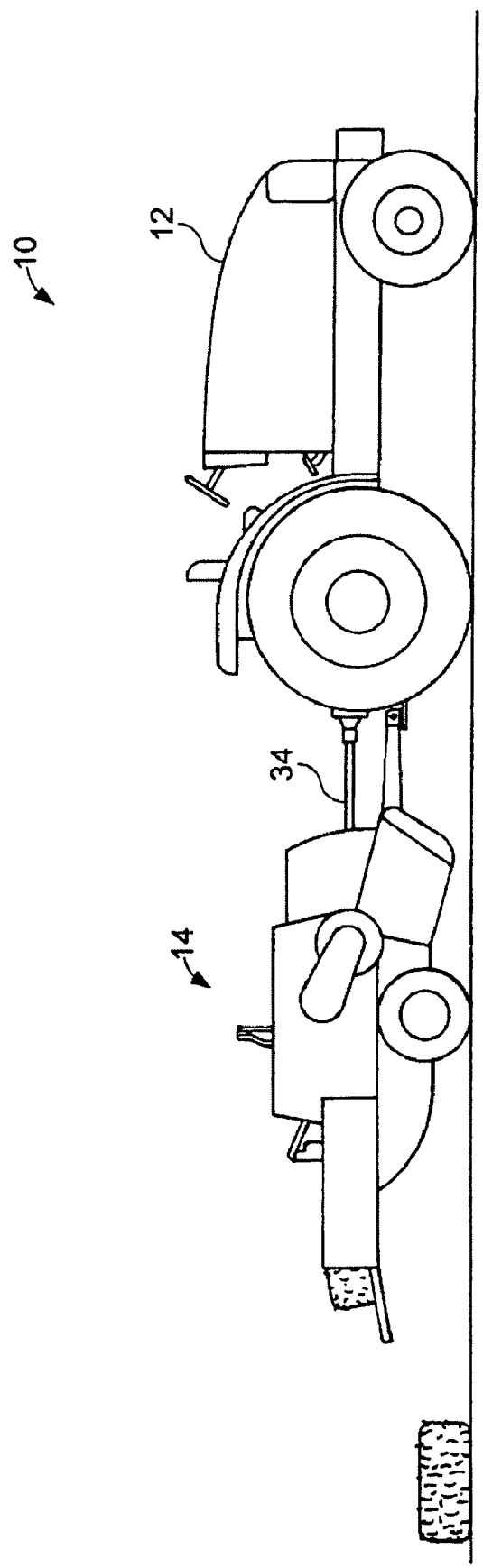
FIG. 1 is a side view of a tractor/baler system utilizing an embodiment of a method of the present invention.

Referring now to the drawings, and more particularly to FIG. 1, there is illustrated a power control system 10 including a tractor 12 and a baler 14. Baler 14 is hitched to tractor 12 and a power take off (PTO) shaft 16 supplies power from tractor 12 to baler 14. As tractor 12 pulls baler 14 and baler 14 encounters crop material, crop material is fed into the baler and the crop material is processed into bales.

Figure 2:
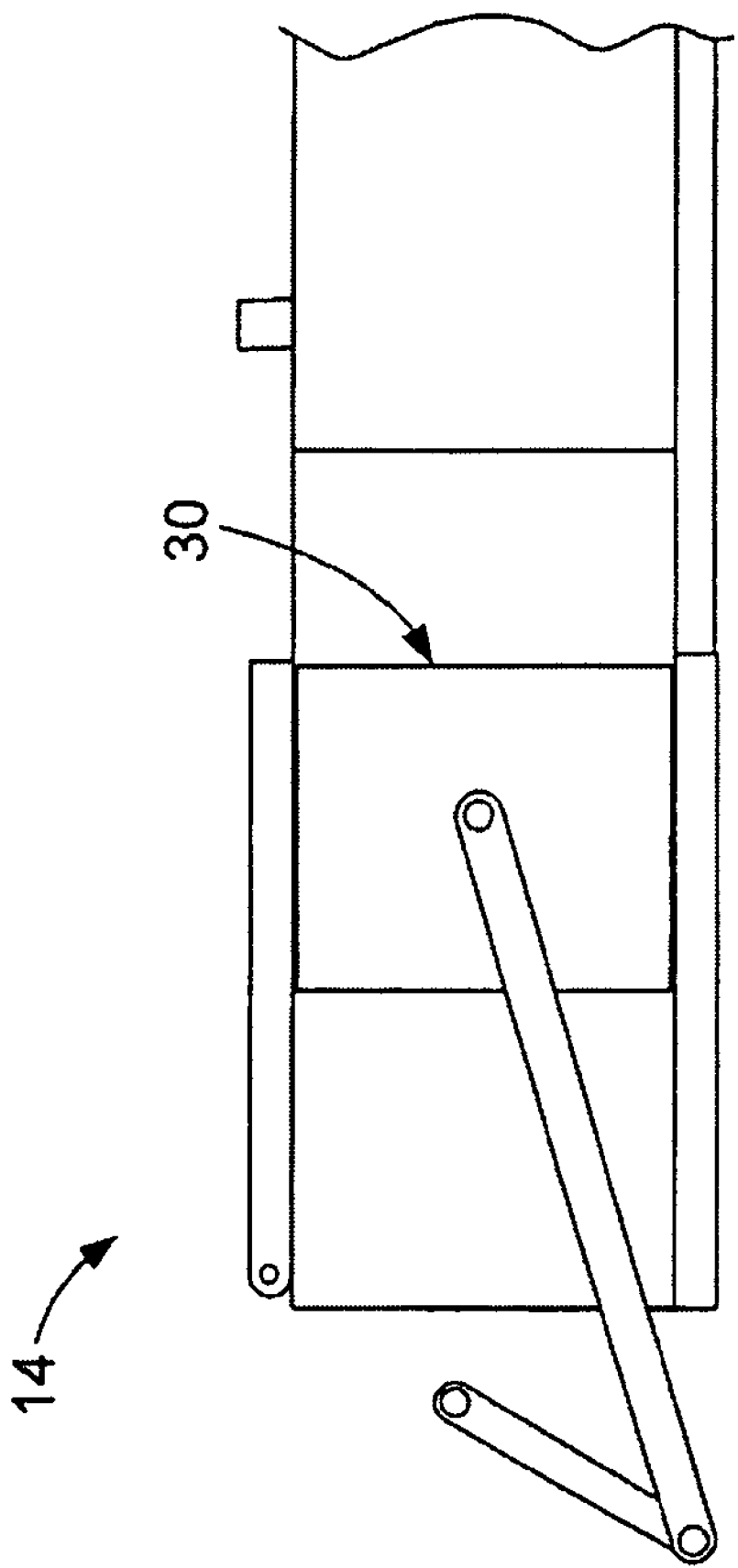
FIG. 2 is a schematical side view illustrating the plunger of the baler of FIG. 1.
Figure 3:
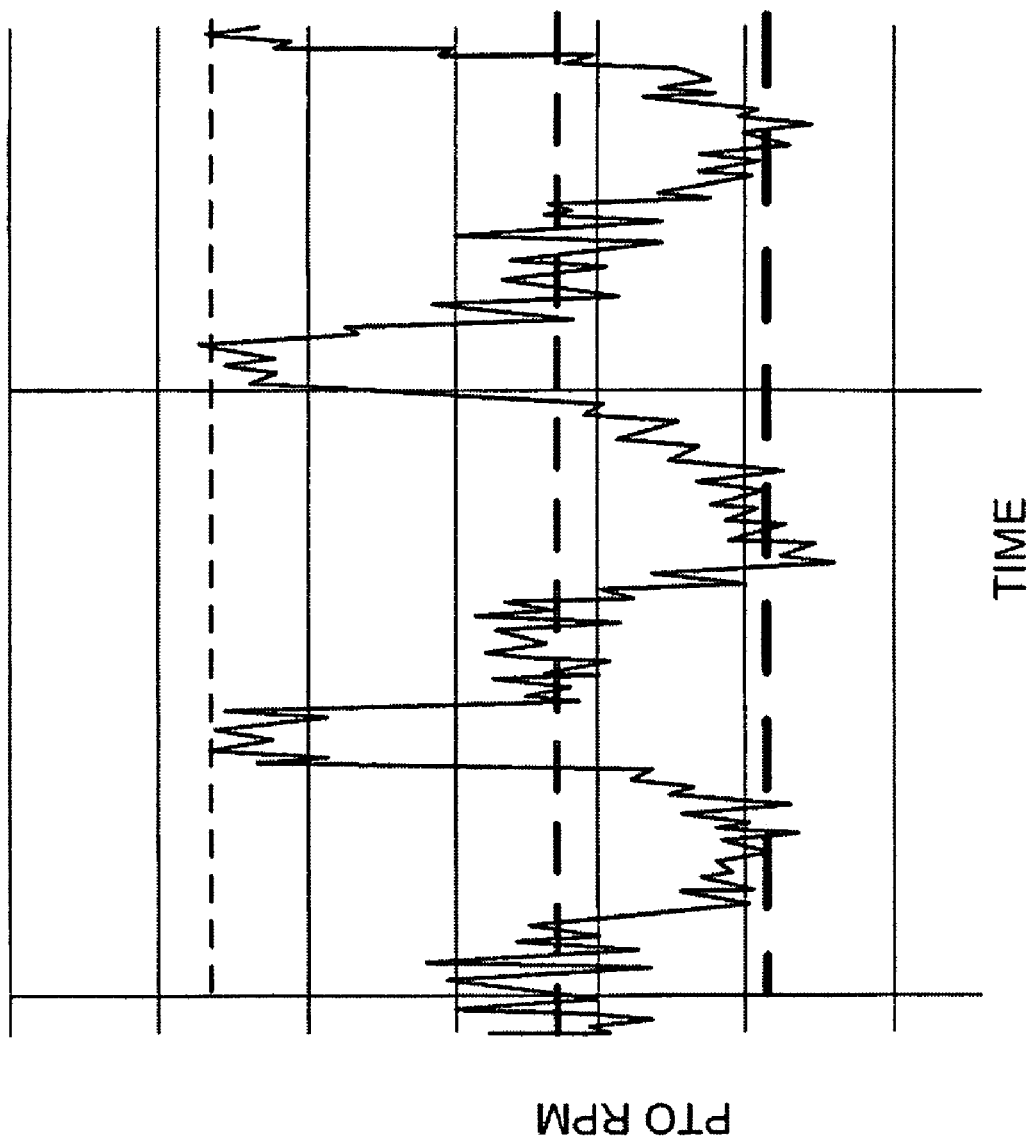
FIG. 3 is a graphical illustration illustrating the problem that is overcome by the present invention.

Now, additionally referring to FIGS. 2 and 3, there is illustrated a side view of baler 14 having a reciprocating plunger therein. As crop material is pulled into the plunging section of baler 14, the PTO RPM begins to reduce as the load is encountered by the plunger as illustrated in FIG. 3. This reduction in the PTO RPM is detected by mechanisms contained in tractor 12 and the reduced RPM of the engine that is reflective of the reducing PTO RPM is compensated for by an increase in the fuel supply to the engine there by causing the overshoot, again illustrated in FIG. 3. Since the cyclical nature of the crop intake is such that the engine control system acts faster than the next cycle of crop material, the engine RPM then is reduced to the nominal level and then after a short period of time the next cycle of crop material enters the baler/plunger system thereby again causing repeated reduction in engine RPM. The present invention overcomes this difficulty by anticipating the load and compensating for the anticipated torque requirement rather than reacting to the reduction in the PTO RPM.

Although the foregoing description illustrates power being supplied by the engine of tractor 12, this is for the ease of illustration and discussion. It is also to be understood that an engine may be installed on baler 14, which would supply power to the functions of baler 14. The interaction between baler 14 and tractor 12, as described herein, is also applicable to the interaction with an engine installed on baler 14.

Figure 4:
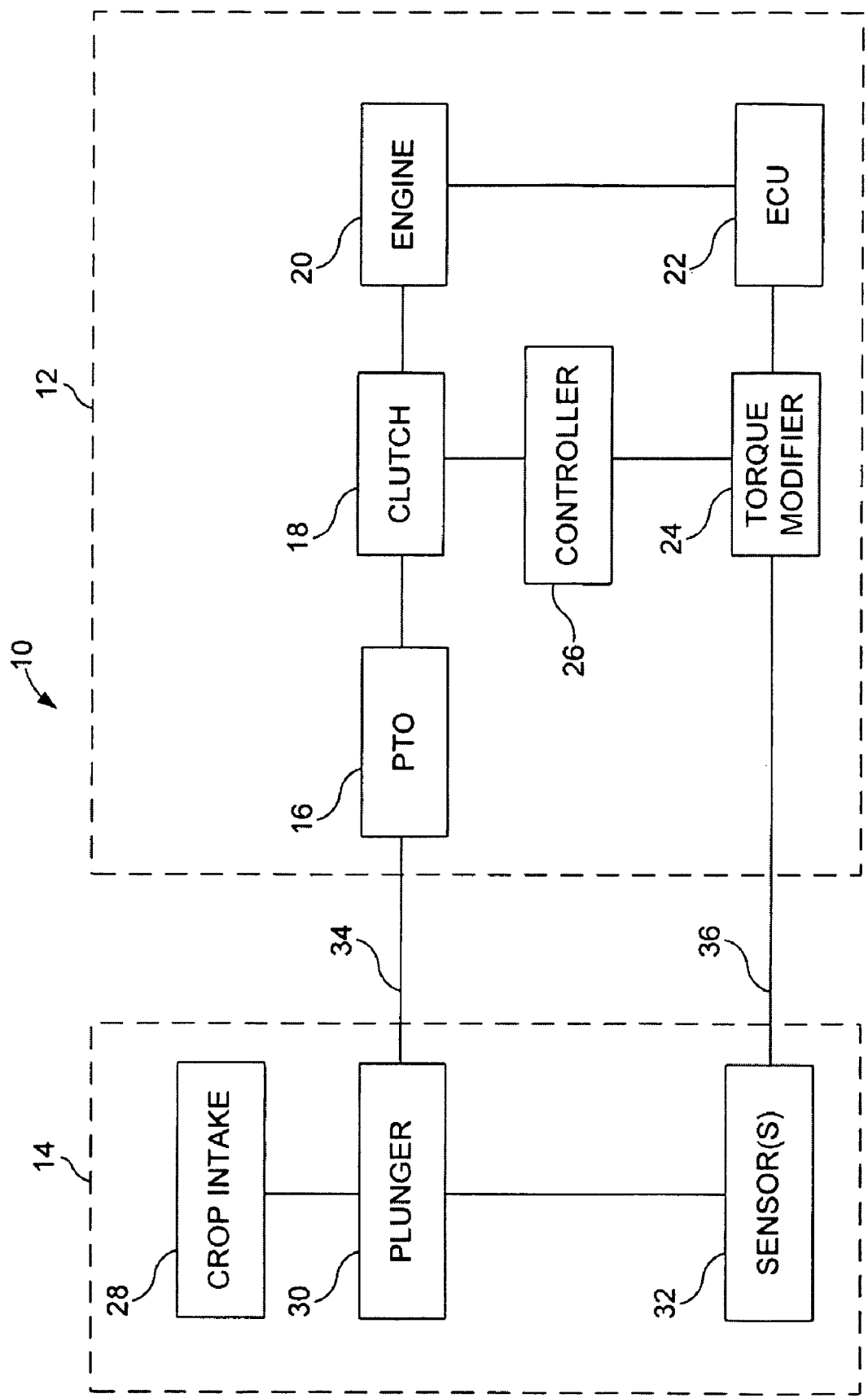
FIG. 4 is a schematical block diagram illustrating the agricultural power control system including the tractor and baler of FIGS. 1 and 2.

Now, additionally referring to FIG. 4, power control system 10 is illustrated schematically as including tractor 12 and baler 14. Tractor 12 includes a PTO 16 that is engaged or disengaged by clutch 18 transferring power from engine 20. Engine 20 is under the control of an engine control unit (ECU) 22 that receives a signal from torque modifier device 24. A controller 26 also receives information from torque modifier 24 as well as operator inputs and inputs from other sensors and has controllable outputs including one that interfaces with clutch 18. Although engine control unit 22, torque modifier 24 and controller 26 have been illustrated and discussed as being separate controls, it is also possible that a single controller would perform all of the functions discussed herein. It is also possible that other combinations of hardware and software may carry out the functions of the present invention.

Engine 20 is a power source which provides power to the various functions of tractor 12 and includes a linkage to PTO 16 by way of clutch 18. Clutch 18 is under the control of controller 26 and includes an engaged position as well as a disengaged position thereby engaging engine 20 to PTO 16 when it is desired to provide power to an implement attached to tractor 12.

Baler 14 includes a crop intake 28 that feeds crop material into a compacting channel in which plunger 30 moves in a cyclical reciprocating manner. Sensors 32 include a sensor to detect the quantity of crop material coming in through crop intake 28 that is being supplied to the pressing channel which plunger 30 will then compress. Further, sensors 32 may be in the form of an anticipatory algorithm that makes a prediction of the amount of crop material that plunger 30 may encounter. Sensors 32 may also detect movement of baler 14 thereby providing information, which may indicate that after a limited number of cycles no more crop material will be coming into crop intake 28 based upon the non-movement of baler 14. Baler 14 is typically connected to tractor 12 by way of a connection to a drawbar on tractor 12. Additionally, PTO shaft 34 is drivingly connected to mechanisms that provide power to plunger 30. Further, sensors 32 provide a signal along a communication channel 36 to torque modifier 24. Although illustrated as sensors 32, this may additionally include processing capability that provides a calculated torque requirement that is then passed on to torque modifier 24. This processed sensor information that comes from element 32 allows tractor 12 to adjust the fuel and/or air mixture going to engine 20 so that the torque that is going to be required by plunger 30 is supplied while it is needed rather than lagging the needed use for torque.

Further, plunger 30 will encounter crop material that is in the compacting channel from a previous cycle even if little or no additional crop material is added. The present invention anticipates the load plunger 30 will encounter, whether the load is due to the added crop material or from the positioning of the crop material in the compacting channel. The variable nature of the anticipated load is what is sensed and the information is used to alter engine performance to thereby supply torque commensurate with the load that is to be encountered.

Element 32 may gauge the amount of crop material that is entering from crop intake 28 into the path of plunger 30. The quantity of material that is going to be engaged in a cyclical manner can vary from cycle to cycle so the anticipated amount or quantity of crop material and the torque necessary to compress it is computed by element 32, the signal containing the information regarding needed torque passes by way of communication channel 36 to torque modifier 24. Torque modifier 24 provides information to ECU 22 thereby causing engine 20 to increase in torque output by increasing the fuel and/or air supply for a commanded amount of time. The occurrence as well as the duration of the transitional torque computed by the system is based on input from sensors 32. Sensors 32 may utilize a comparative routine in which the amount of crop material previously encountered by plunger 30 is compared to the current measured amount of crop material and the necessary torque requirement developed based upon previous observations. Additionally, the algorithm in sensors 32 may additionally have predetermined time durations of torque based upon observational input from the sensors associated therewith to provide the signal representative of the amount and duration of torque needed by baler 14.

When controller 26 detects input from an operator indicating that clutch 18 should be disengaged, then this information is additionally passed along to torque modifier 24 so that signals from sensors 32 will be ignored when clutch 18 is disengaged. The feedback from baler 14 should be disregarded since engine 20 is no longer going to provide power to baler 14 due to the disengagement of clutch 18.

Figure 5:
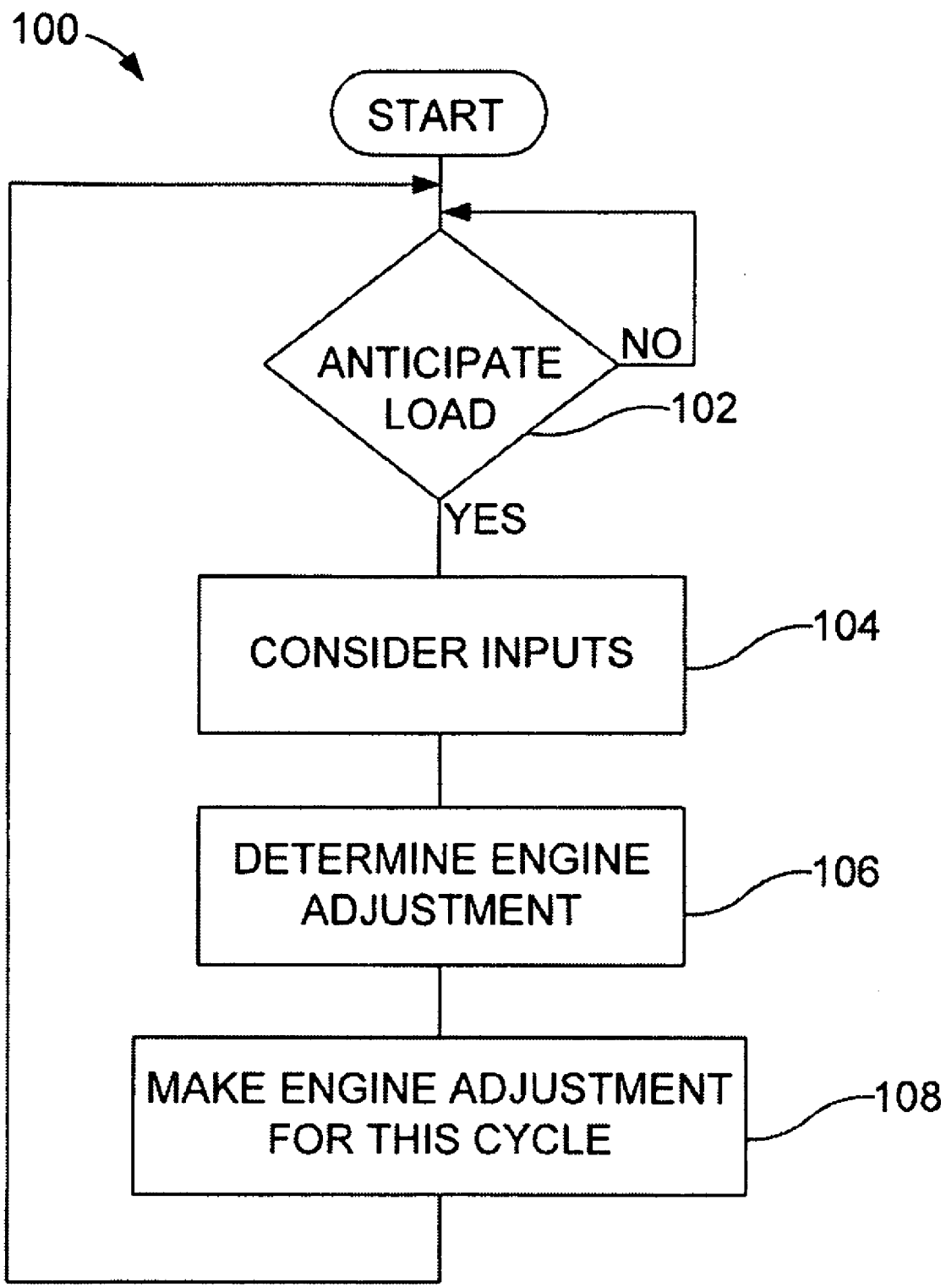
FIG. 5 is a schematical representation of a method utilized in the present invention.

Now, additionally referring to FIG. 5 there is schematically shown a method 100 that further illustrates the method of the present invention. At step 102, a load is anticipated such as a new flake of crop material being detected. Method 100 proceeds to step 104. If no increased load is anticipated, such as no new crop material being detected by sensors 32, then method 100 returns to the beginning of the method. At step 104, inputs from sensors 32 are considered. The inputs that are considered may include the last cycle engine pulldown, exemplified by either a speed or fuel usage change, the last plunger force measurement, the plunger speed, the plunger position and of course the detected crop intake. Based on the inputs that are received, the engine adjustment is determined at step 106. This adjustment includes the amount and duration of torque requirement needed to process the new flake detected at step 102. The determination considers the previous cycle or cycles of plunger 30 as well as the current plunger speed and plunger position. Method 100 then proceeds to step 108 where the necessary adjustments to the fuel and/or air intake for engine 20 is modified for the anticipated duration of crop encountering the cycle of plunger 30. Step 108 is timed to correspond with a determined plunger position that may be adjusted based upon the current plunger speed. For example, if the plunger speed is above the nominal amount then the increased torque requirement might be reduced to accommodate the inertia that is contained in the current plunger speed.

The present invention helps to control the speed change of the engine as well as the jerk encountered by the baler. Initially in the crop baling cycle, there is a pulldown of the engine during the high impulse compression part of the plunger cycle and the overshoot of the engine responds to the plunger pulse after the event has been eventually completed. The present invention overcomes this disadvantage. One embodiment reduces the initial engine pulldown by using a short "micro-burst" engine speed increase to compensate for the anticipated load. To reduce the overshoot, ECU 22 can also "freeze" the engine control that includes engine speed and fuel rate and prevent the system from overreacting. An additional advantage of the present invention is that it allows the baler to communicate with the tractor thereby tailoring the engine response to the anticipated load of the implement, herein represented by baler 14. This reduces the engine speed changes while baling, it reduces fuel usage and offers less operator fatigue since the system is not cycling the engine from an under speed to an over speed condition.

Having described the preferred embodiment, it will become apparent that various modifications can be made without departing from the scope of the invention as defined in the accompanying claims.

The invention claimed is:

1. An agricultural power control system, comprising:
    an agricultural baler having a moving element in the form of a plunger, the plunger being configured to engage a quantity of crop material in a cyclical manner;
    a tractor having a fuel consuming engine, said tractor being coupled to said baler and conveying power to said moving element;
    a signal generating element coupled to said baler and being configured to provide a signal relating to an anticipated quantity of crop material prior to said moving element engaging said quantity of crop material; and
    a torque modifying device being coupled to said tractor and being configured to provide an increased amount of at least one of said fuel and air to said engine dependent upon said signal so as to alter an amount of torque delivered to said moving element dependent upon said signal.

2. The agricultural power control system of claim 1, wherein said signal generating element is a sensor configured to generate said signal by detecting said quantity of crop material prior to said moving element engaging said quantity of crop material.

3. The agricultural power control system of claim 1, wherein said torque modifying device is configured to time said increased amount of at least one of fuel and air is supplied to said engine such that said engine generates additional torque that is delivered to said plunger as said plunger engages said quantity of crop material.

4. The agricultural power control system of claim 1, wherein said increased amount of at least one of fuel and air is supplied to said engine for a duration time dependent upon said quantity of crop material.

5. The agricultural power control system of claim 1, wherein said tractor includes:
 a power take off; and
 a power take off control, said power take off being drivingly coupled to said plunger, said power take off control controlling a driving coupling between said engine and said power take off, said power take off control including an engaged mode and a disengaged mode, said signal being disregarded by said torque modifying device when said power take off control is in the disengaged mode.

6. The agricultural power control system of claim 1, wherein said signal generating element is a predictive device generating said signal dependent upon previous encounters of said moving element with previous quantities of said crop material.

7. The agricultural power control system of claim 5, wherein said torque modifying device is configured to time said increased amount of at least one of fuel and air that is supplied to said engine such that said engine generates additional torque that is delivered to said plunger as said plunger engages said quantity of crop material.

8. The agricultural power control system of claim 7, wherein said increased amount of at least one of fuel and air is supplied to said engine for a duration time dependent upon said quantity of crop material.

\* \* \* \* \*